US010500665B2

(12) United States Patent
Cash (10) Patent No.: US 10,500,665 B2
(45) Date of Patent: Dec. 10, 2019

(54) ORBITAL WELDER WITH INTEGRATED TRACK AND GEAR DRIVE

(71) Applicant: Shane Cash, Lawrenceville, GA (US)

(72) Inventor: Shane Cash, Lawrenceville, GA (US)

(73) Assignee: BHI ENERGY I SPECIALTY SERVICES LLC, Lawrenceville, GA (US)

( * ) Notice: Subject to any disclaimer, the term of this patent is extended or adjusted under 35 U.S.C. 154(b) by 353 days.

(21) Appl. No.: 15/451,244

(22) Filed: Mar. 6, 2017

(65) Prior Publication Data

US 2017/0252845 A1 Sep. 7, 2017

Related U.S. Application Data

(60) Provisional application No. 62/303,955, filed on Mar. 4, 2016.

(51) Int. Cl.
*B23K 9/028* (2006.01)
*B23K 9/02* (2006.01)
*B23K 9/16* (2006.01)
*B23K 37/02* (2006.01)
*B23K 101/10* (2006.01)
*B23K 101/06* (2006.01)

(52) U.S. Cl.
CPC .............. *B23K 9/0286* (2013.01); *B23K 9/16* (2013.01); *B23K 37/0217* (2013.01); *B23K 37/0282* (2013.01); *B23K 2101/06* (2018.08); *B23K 2101/10* (2018.08)

(58) Field of Classification Search
CPC ......... B23K 9/02; B23K 9/028–9/0282; B23K 37/053–37/0538; B23K 37/0417; B23K 37/0211; B23K 37/0247
See application file for complete search history.

(56) References Cited

U.S. PATENT DOCUMENTS

| | | | | |
|---|---|---|---|---|
| 3,461,540 A * | 8/1969 | Nelson | ............... | B23K 37/0533 219/61 |
| 3,555,875 A * | 1/1971 | Clark | .................... | B21D 41/00 72/292 |
| 3,612,502 A * | 10/1971 | Vasiliev | ................. | B23K 7/007 266/54 |
| 4,243,868 A * | 1/1981 | Graham | ............... | B23K 9/0286 219/125.11 |
| 6,380,505 B1 * | 4/2002 | Stoops | ................. | B23K 9/0286 219/125.11 |
| 10,099,319 B2 * | 10/2018 | Kocks | .................. | B23K 9/0286 |
| 2012/0074205 A1 * | 3/2012 | Dagenais | ........... | B23K 37/0533 228/102 |
| 2014/0034714 A1 * | 2/2014 | Gatlin | .................. | B23K 9/0286 228/212 |
| 2014/0259597 A1 * | 9/2014 | Lavalley | ................ | B21D 19/10 29/407.1 |

(Continued)

*Primary Examiner* — Michael A Laflame, Jr.
(74) *Attorney, Agent, or Firm* — Donn K. Harms (57) ABSTRACT

An orbital welding device for forming a circumferential weld bead to engage adjoining segments of pipe is provided. The device features an annular track ring having an opening for engagement around the pipe. A travel carriage rotationally engaged with the annular track ring has a first motor for rotating the travel carriage and an engaged welding head around the pipe for forming a weld thereon. A second motor is provided to adjust a distance of the welding head from the pipe.

8 Claims, 8 Drawing Sheets

(56) References Cited

U.S. PATENT DOCUMENTS

2015/0165672 A1* 6/2015 Montgomery ...... B29C 65/7802
  156/272.2
2016/0008907 A1* 1/2016 Miller .................. B23K 9/0286
  219/60 A

* cited by examiner

ORBITAL WELDER WITH INTEGRATED TRACK AND GEAR DRIVE

BACKGROUND OF THE INVENTION

1. Field of the Invention

This application claims priority to U.S. Provisional Patent Application Ser. No. 62/303,955, filed on Mar. 4, 2016, which is incorporated herein in its entirety by this reference thereto.

The present invention relates generally to welding. More particularly it relates to a welding device configured for orbital welding of pipe to pipe joint and fitting welds which employs an integrated track with gear drive which is adapted for circumferential engagement with the exterior of pipes being welded. So engaged, the integrated configuration will operate under axial and radial constraints which are heretofore unavailable in such welding devices.

2. Prior Art

In industries employing pipe and tubes for carrying liquids and gases, a conventional method for joining two abutting tubular segments, such as pipes or tubes or fittings engaged therewith, is to butt the respective ends of the segments to be joined, and orbitally weld the adjacent ends. In such orbital welding, conventionally either the two abutted segments are rotated past a welding head, or the welding head itself rotates around the circumference of the tubes or pipes and employs appropriate welding technique and materials to join the two segments. The more common mode of the two options is moving the welding head in a circumferential path around the stationary abutted segments.

During such an orbital welding procedure, a wire feed is provided of a metal material appropriate to weld the metal forming the two segments being joined. It is desirable that the welder be adapted to concurrently communicate an inert gas to the weld site with the wire, to protect the formed pool of molten metal of the weld from oxygen and moisture and other contaminants. Such is required so that the resulting weld is cleanly formed.

Additionally, the communication of inert gas to the welding site protects against welding imperfections and impurities being included in the metal of the finished weld. Consequently, the ability of an orbital welder to concurrently communicate an inert gas along with the appropriate wire welding material, at the appropriate speed to weld the abutted segments smoothly and uninterrupted during the operation, is a universal requirement.

A significant shortcoming of conventionally available orbital welders for pipe and tubing and the like, is the inability to for conventional devices to operate under conditions where the orbital welding device must operate with tight clearances such as where the adjoining pipes are curved. Such clearances occur due to surrounding pipes and tubes and components proximal to the two abutted segments being welded and can subject an orbital welder to operational requirements having very small axial and/or radial constrains for example less than six inches. Of course this distance is dependant on the diameter of the pipes being joined and the overall diameter of the orbital welding device performing the weld.

As such, there is an unmet need for an orbital welding device, which is configured orbital welding of abutted pipes, tubes, and fittings and the like, which once engaged is capable of producing defect-free welds to join adjacent tube and pipe segments. Such a device should be modular to allow for easy installation and customization. Further, such a device should be able to effectively operate with axial and radial constraints below 6 inches and as small as 2.5 inches to allow for use in areas with very tight constraints. Still further, such a device no matter the diameter of the orbital welding assembly, should be configured to minimize the diameter of the assembly and engaged components, in order to weld pipes running adjacent or parallel in very tight spacing constraints.

The forgoing examples of related art and limitations related therewith are intended to be illustrative and not exclusive, and they do not imply any limitations on the disclosed low clearance orbital welding invention and method described and claimed herein. Various limitations of the related art are already or will become apparent to those skilled in the art upon a reading and understanding of the specification below and the accompanying drawings.

SUMMARY OF THE INVENTION

The device and method herein disclosed and described provides a solution to the shortcomings of conventional orbital welders for pipe and tubing noted above. The disclosed welding device and method, is configured with an integrated track and gear drive rending it capable of welding abutting segments such as of pipe, tube, or fittings, where such welding must be accomplished under axial constraints as low as 3.5" and radial constraints as low as 2.5". The welding device employing this integrated configuration is easily engageable to an as-used position to join adjacent abutting edges of pipes or fittings or the like, by assembly and engagement of a plurality of components forming the orbital welding assembly.

A first of these assemblies or components includes an annular track ring having an interior opening which is sized to adjustably engage around pipe or tubing of varying sizes smaller than an inner circumference of the opening in the track ring. The track ring includes two sections which are pivotally engaged on one end allowing for a pivoting of the sections to achieve an easy engagement around a one pipe or tube or one of the two segments to be welded. Once fitted around the pipe, the two segments are engaged on an opposite side from the pivoting connection, with a locking component which thereby fixes the two halves into an annular configuration having an opening surrounding the pipe or tube or the like to be welded.

The track ring assembly is configured with adjustable feet or members which are adjustably translatable toward and away from an interior circumferential surface of the opening in the track ring. By adjusting the length of projection of the distal ends of the feet or members, the opening and thus the track ring may be configured to center around the exterior of a pipe to which it engages.

The two sections of the track ring assembly include an integrated gear rack which is formed as a unitary structure with the two hinged or pivoting sections of the body of the track ring by machining gear teeth into the body of the ring. Positioned on an exposed face of the track ring, are OD and ID 90 degree rails. These rails define a race or travel path for an engageable travel carriage.

A second component of the track ring assembly of the device is a curved travel carriage which includes mounted components thereon for a roller mechanism. This travel carriage is operatively engaged with the track ring and powered to circumferentially travel around and engaged with the track ring.

A third component of the welding device herein, is a circumferential travel axis which is configured in a low profile 90 degree motorized rotatable member. This motorized travel axis is operatively engaged adjacent a first end of the travel carriage and rotates a gear engaged to the gear rack on the track ring, to thereby power the circumferential travel of the travel carriage around the track ring. The motor powering this rotation enabled by the gear and gear train engagement, is water cooled to protect the motor and components.

Engaged, adjacent an opposite end of the travel ring, is an AVC (Automatic Voltage Control) motor-powered rotatable axis which is a low profile degree motorized rotational member. The AVC axis has a housing in an engagement with the travel carriage of the assembly. An electric motor powered rotation of the AVC controlled rotating member, communicates rotary motion to an arm which is engaged to a weld head. This arm supports the weld head front end assembly which performs the welding of the abutted portions of pipe or fittings. This AVC motor powered axis is also preferably water cooled to protect the motor and components during use.

In operative engagement to the rotating member which rotates around the AVC axis, is the weld head front end. This consists of a mechanical cross seam assembly coupled with a torch block assembly and a two-division of freedom wire manipulation device. This torch block assembly is preferably also water cooled to maintain operative ability even under high heat conditions.

Providing wire to the torch block assembly, is a remote wire feed component. This remote wire feed is configured and controlled to provide for automatic wire feed into the weld arc during operation of the device herein at an appropriate rate to form the circumferential weld of abutting pipe or fittings. This remote wire feed component is transportable to the site of the welding device as it is operatively positioned within a case.

This novel integration of the track ring assembly with the mounting component provides a configuration which is able to make pipe to pipe and pipe to fitting welds, where no component extends beyond the exterior circumference of the track ring assembly by more than 0.75 inches, renders the device operative where the axial and radial constrains are as low as 3.5" and 2.5". Further, the adjustable track ring engagement to the pipe herein, significantly lessens the amount of time required to set up the orbital welding device herein to make such welds.

This ease of mounting using the pivoting connecting track ring sections, is accomplished through the provision of a pivoted or hinged engagement opposite a locking latch to hold the formed components to a ring once circumferentially positioned around a pipe. So configured and engaged, the disclosed orbital welding device herein, is capable of engagement to a pipe within 3" of the weld joint. Coupled with the water-cooled motors rotating multiple axes, the device provides the ability for the orbital welder herein to operate with the noted low clearances and to function within high ambient heat conditions which can reach 500F.

Further, in an optional but preferred mode, a motorized OSC axis may be added as an option to oscillate the welding head during operation. Motorizing the OSC axis provides the ability to utilize programmed oscillation during the welding operation and allows programmed oscillation of the tungsten or other wire material to oscillate within a programmed speed and distance such as a currently preferred oscillation stroke of up to 0.9"

With respect to the above description, before explaining at least one preferred embodiment of the herein disclosed orbital welding device and method in detail, it is to be understood that the invention is not limited in its application to the details of construction and to the arrangement of the components in the following description or illustrated in the drawings. The invention herein described is capable of other embodiments and of being practiced and carried out in various ways which will only become obvious to those skilled in the art upon reading this disclosure. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other orbital welders capable of operation in high heat and minimal clearances. It is important, therefore, that the claims be regarded as including such equivalent construction and methodology insofar as they do not depart from the spirit and scope of the present invention.

It is an object of the invention to provide an easily removably positionable orbital welding device for joining tubes pipes and fittings.

It is an object of the invention to provide such an easily engaged orbital welding assembly for welding abutted pipes and fittings which is capable of operating in conditions with minimal radial and axial space.

These and other objects features, and advantages of the present invention, as well as the advantages thereof over existing prior art, which will become apparent from the description to follow, are accomplished by the improvements described in this specification and hereinafter described in the following detailed description which fully discloses the invention, but should not be considered as placing limitations thereon.

BRIEF DESCRIPTION OF DRAWING FIGURES

The accompanying drawings, which are incorporated herein and form a part of the specification, illustrate some, but not the only or exclusive, examples of embodiments and/or features of the orbital welder and method herein. It is intended that the embodiments and figures disclosed herein are to be considered illustrative rather than limiting.

In the drawings.

DETAILED DESCRIPTION OF THE PREFERRED EMBODIMENTS OF THE INVENTION

In this description, the directional prepositions of up, upwardly, down, downwardly, front, back, top, upper, bottom, lower, left, right and other such terms refer to the device as it is oriented and appears in the drawings and are used for convenience only and they are not intended to be limiting or to imply that the device has to be used or positioned in any particular orientation.

Figure 1:
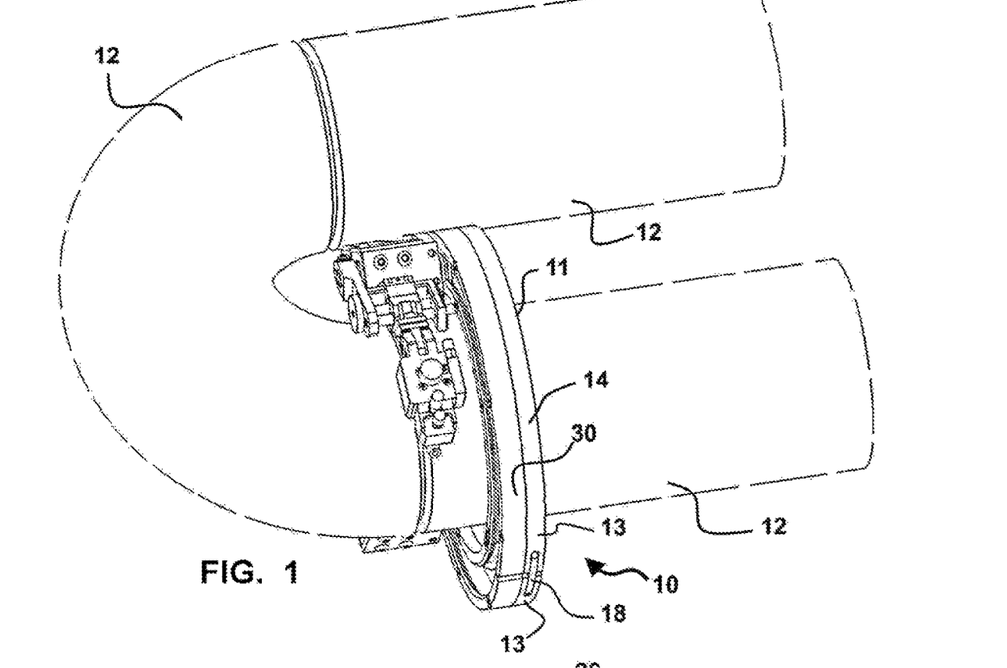
FIG. 1 depicts a perspective view of the orbital welding device herein, assembled and in an as-used position operatively engaged about the circumference of a pipe or tube for welding abutting edges of adjoining segments and showing the integrated track and gear configuration enabling employment of the device with minimal axial and spacing from surrounding objects.

Now referring to drawings in FIGS. 1-10, wherein similar components are identified by like reference numerals, there is seen in FIG. 1 the FIG. 1, the orbital welding device 10 herein. As shown the device 10 forms an assembly 11 when assembled and operatively engaged upon one of two adjoining segments to be welded, such as pipe 12, to an as-used position operatively engaged with one of two pipes 12 or fittings for welding abutted edges thereof.

Figure 5:
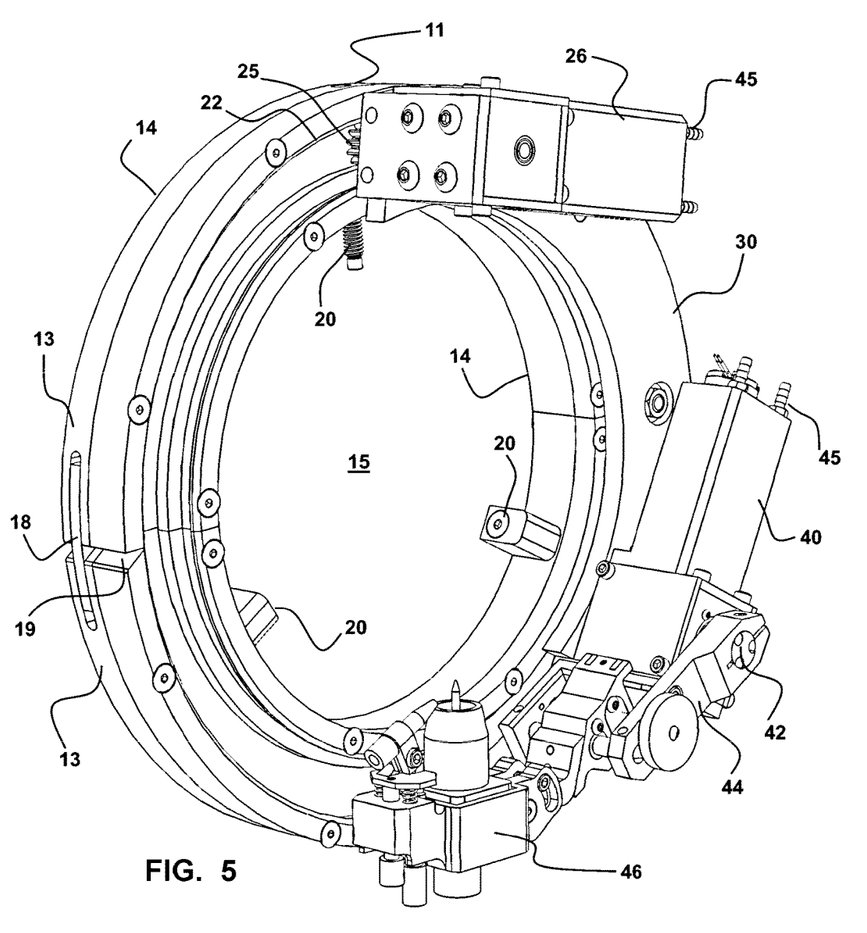
FIG. 5 is a perspective view of the device as in FIG. 2 but enlarged for easier component viewing of the formed ring assembly.
Figure 6:
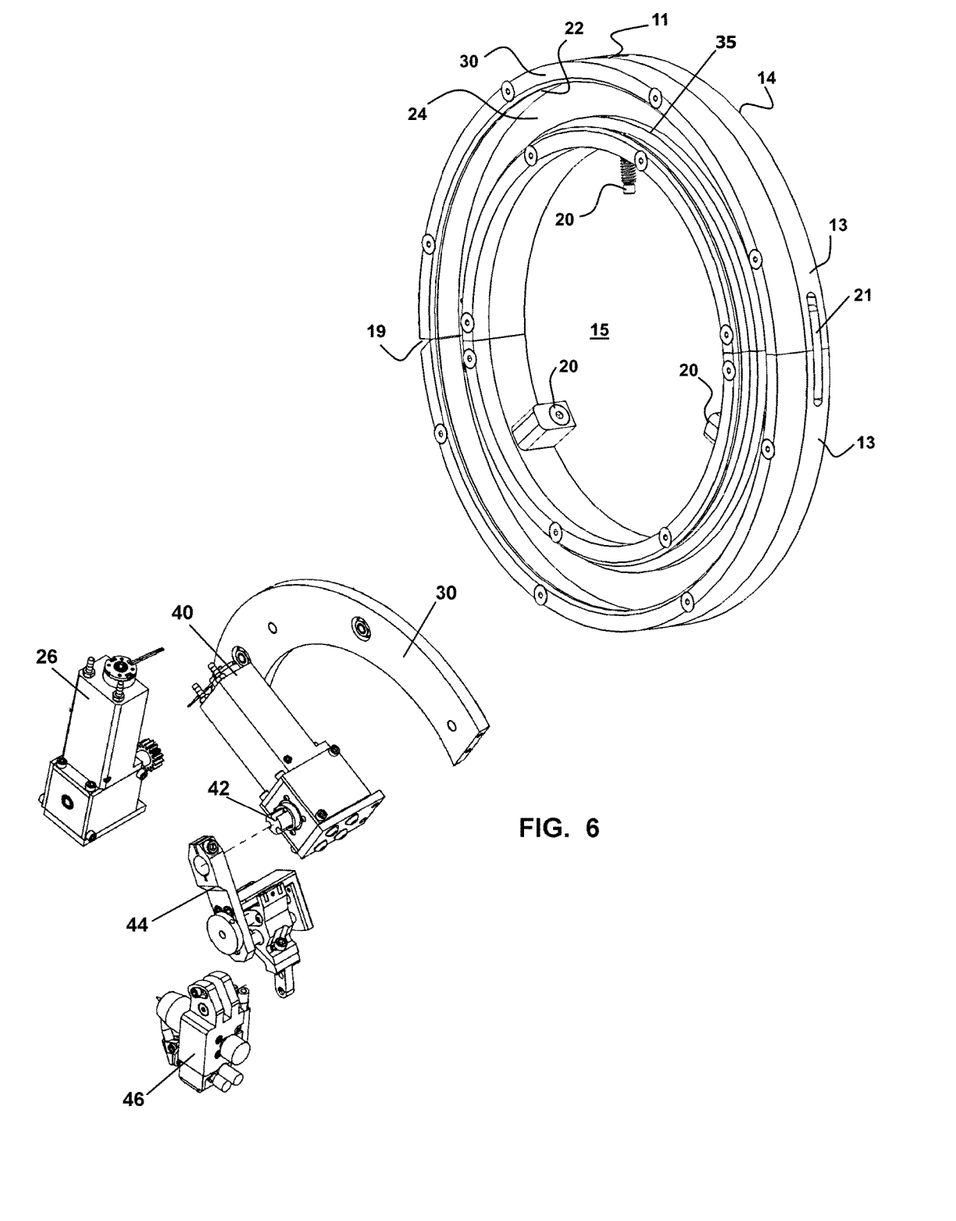
FIG. 6 is a view of the integral track ring component showing the translatable centering feet or members and the circular race around which the engaged travel carriage travels.
Figure 7:
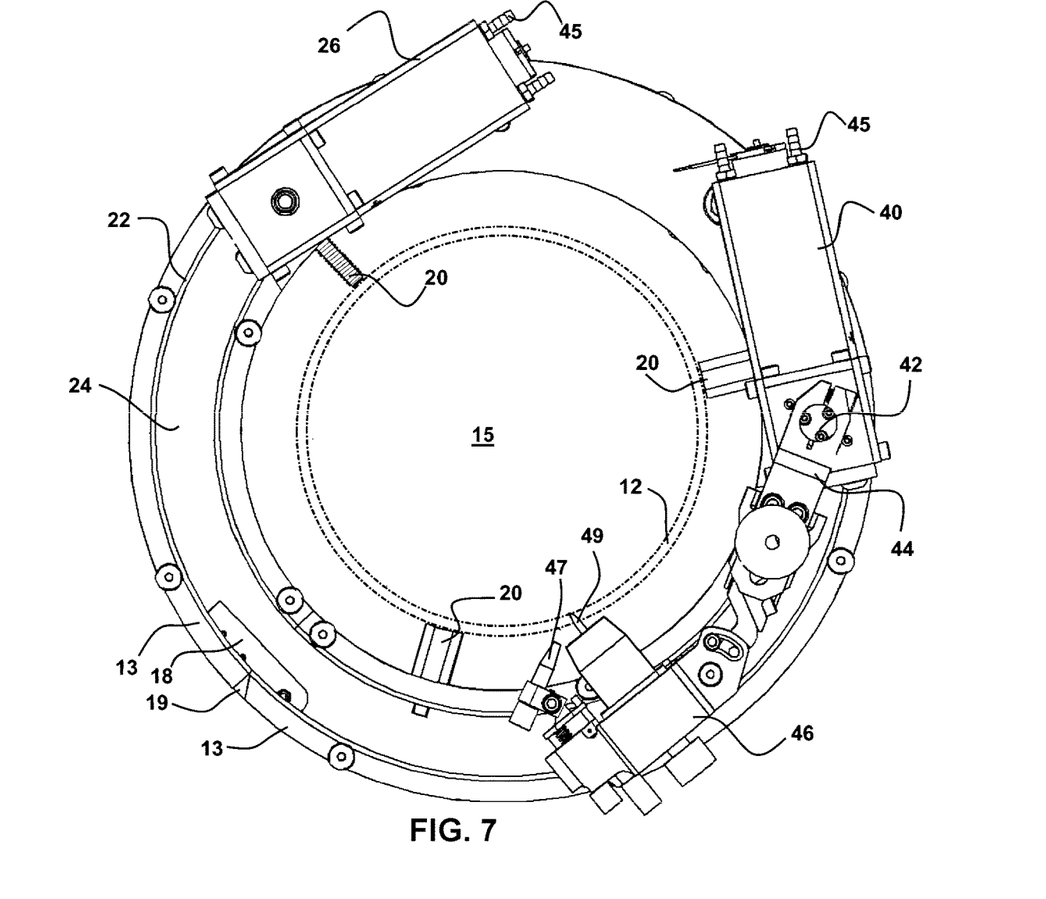
FIG. 7 is an overhead plan view of the device as in FIG. 5 showing the various components engaged with the track ring assembly.

As shown in the drawings herein, the device 10, is formed to an assembly 11 which includes a track ring 14. This track ring 14 as better shown in FIGS. 5-6, is formed from a pair of segments 13 which are rotationally at respective first ends of the two abutting half circle segments 13 engaged a pivotal engagement 18. A notch or relief 19 positioned at an outside edge of each of the segments 13 at the pivoting engagement 18, allows the two segments 13 to rotate away from each other until the respective first ends of each segment 13 contact each other. This rotational pivotal engagement 18 of first ends of the two segments 13 forming the track ring 14 and defining the opening 15 therein, allows the formed track ring 14 to rotate open at respective second ends of both segments 13 opposite the pivotal engagement 18 at the first ends thereof.

Moving the respective second ends of the respective track ring segments away from each other, allows the opening 15 in the track ring 14 defined by the interior circumference of the closed and locked track ring 14, to be positioned to encircle one of the adjoining pipes 12 to be welded.

At the respective second ends of the half-circle shaped segments 13, opposite the first ends having the pivoting engagement 18, a lock shown as latch 21 (FIG. 4) is engageable to hold the track ring 14 in the annular shape having the circular opening 15, surrounding the pipe 12 or fitting or the like to be welded.

To center the circumference of the opening 15, formed by the engaged abutted segments 13 of the track ring, around the pipe 12 within located within the opening 15 defined by the interior circumference of the track ring 14, a plurality of radially positioned translating members shown as adjustable feet 20 extend from connections with the track ring 14 on the interior circumference of the track ring 14. One or more of the translating adjustable members or feet 20, are adjustable in their engagement with the track ring 14, such as with threads 23 on both (FIG. 4), such that rotation causes the distal ends of the feet 20 to translate toward or away from a center point within the opening 15 defined by the interior circumference. By adjusting the length of projection of the distal ends of the feet 20, the track ring 14 may be removably engaged with and centered around the circumference of one of the two segments of pipe 12 or the like to be welded.

Figure 4:
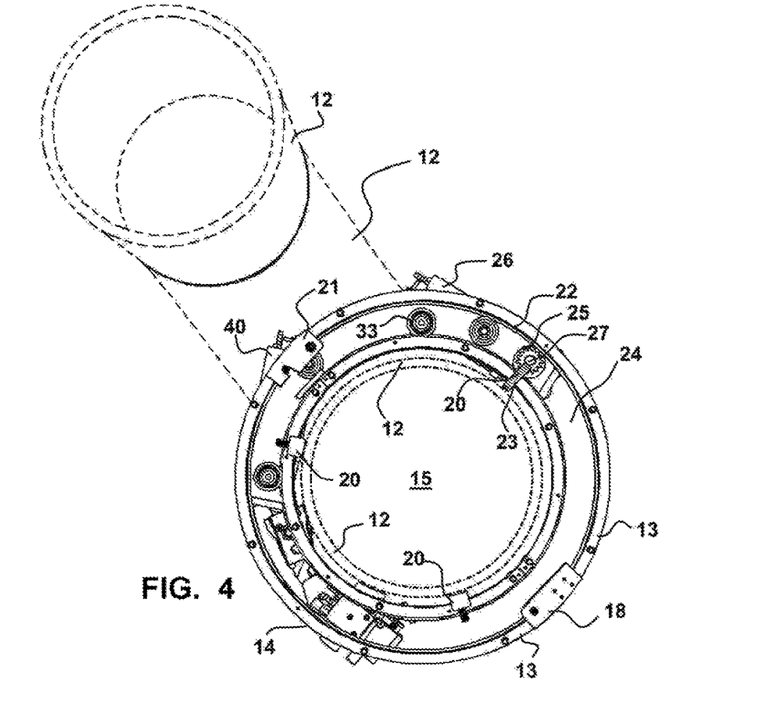
FIG. 4 is an end view of the device of FIG. 3 with a rear surface of the locked ring assembly removed, to better show interior components and their interaction.

Each of the two C-shaped sections 13 in a pivoting engagement 18 forming the track ring 14 has an integral portion of a gear train or gear rack 22, formed therein which is engageable through a recess 24 of the track ring 14 once it is locked into the annular configuration of FIG. 1, 4, or 6 for example. This track ring 14 and integral gear rack 22 yields an exceptionally compact configuration which is adapted for engagement with a gear 25, operatively connected with a powered axle 27 or member in operative communication with a first electric motor 26 described below and shown in FIGS. 4-5.

The compactness of this engagement allows for very small clearances as noted earlier. This first motor 26 is engaged to one end of a curved travel carriage 30 which rotationally engages upon the track ring 14 while in a fixed engagement to the pipe 12. The travel carriage 30 rotates in engagement to the fixed track ring 14 on a plurality of rollers 33 which engage and travel along a race 35 formed on one or both opposing sides of the recess 24 depending into one side of the track ring 14.

Thus, communicating power to the first motor 26 will cause the travel carriage 30, to rotate around its engagement within the recess 24 on the track ring 14 which is in a fixed engagement with a pipe 12 or the like, using the compressive engagement of translating members or feet 20 thereon. The travel carriage will rotate any other component engaged with the travel carriage 30 at the same rate of rotation of the travel carriage 30. This rate of rotation or rotational speed of the travel carriage 30, and components engaged thereto, can be controlled by a controller (not shown but well known) which can meter the supply of electric power communicated to the first motor 26, and thereby control its rate of rotation and that of the gear 25 engaged with the gear rack 22 of the track ring 14. As shown for example, in FIG. 7, and others, the welding head 46 has conventional connectors for gas 47 and to communicate the wire 49 to a weld 17.

At an opposite end of the curved track ring 14, is engaged a second electric motor 40, which is engaged with a rotating axle shaft 42 which can rotate concurrently with the rotation of the track ring 30 powered by the first motor 26. This second motor 40 is connected to a controller or automatic voltage control (AVC) (not shown but well known) to control a speed and direction of a rotatable axial shaft 42.

Figure 3:
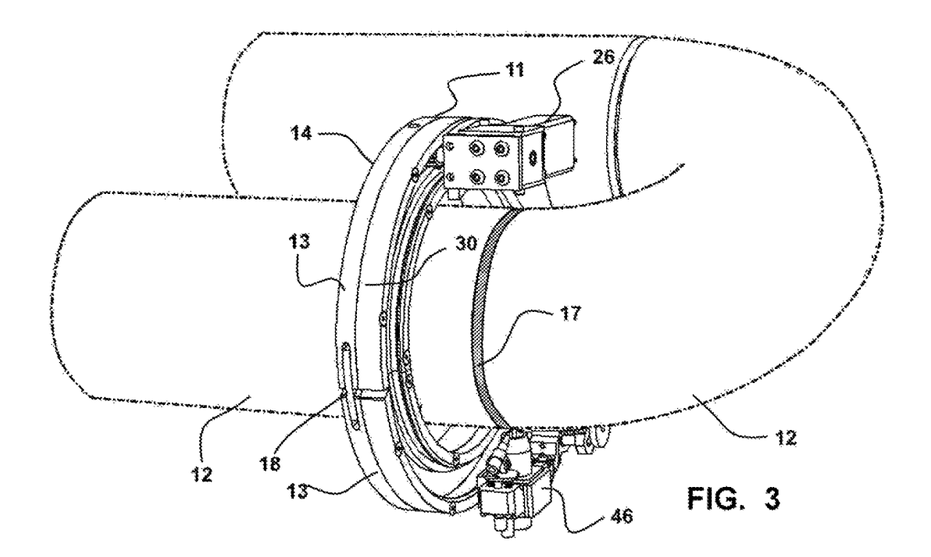
FIG. 3 depicts the device as in FIG. 1, but from an opposite side, showing the device in the as-used position operatively engaged with the tube or pipe and forming a weld to connect adjoining pipe edges.
Figure 10:
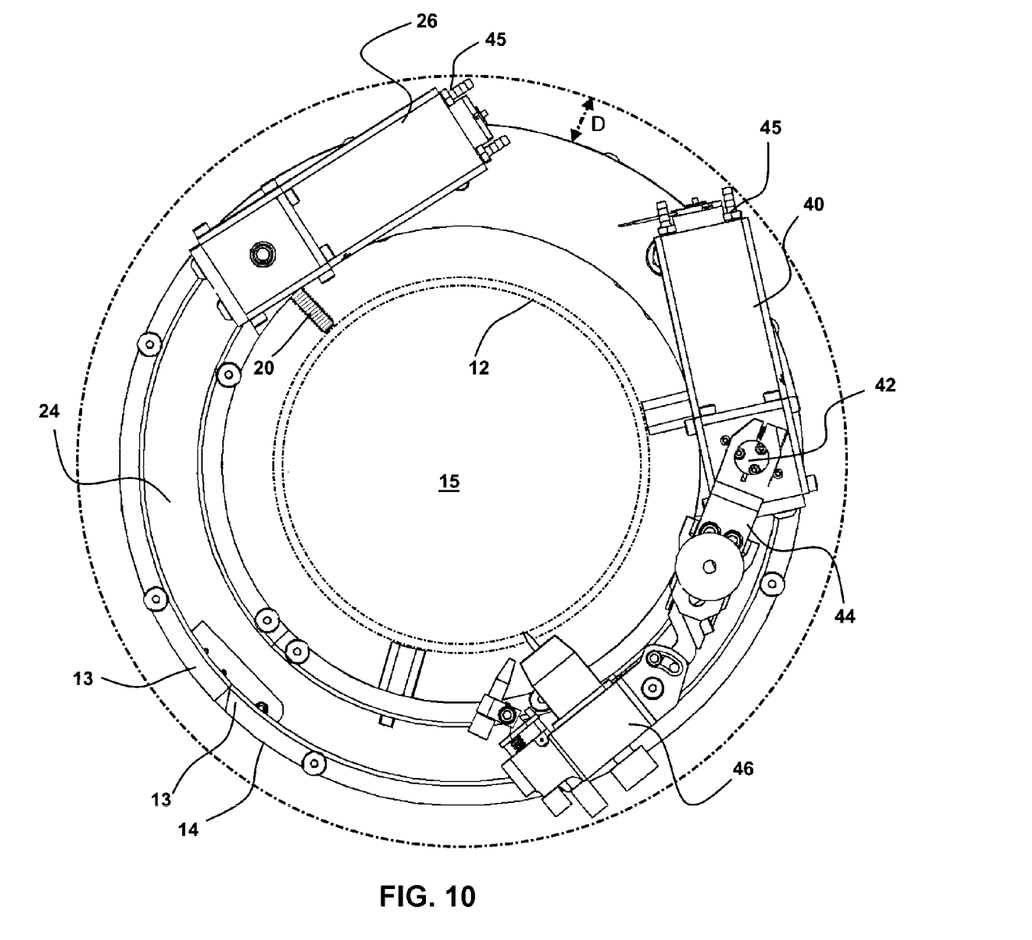
FIG. 10 depicts the ring assembly showing the desired maximum distance of projection "D" of engaged components past the exterior circumference of the engaged ring assembly.

This second motor 40 much like the first motor 26 is low profile and as seen in FIGS. 4 and 10 and with the first motor 26 and other components engaged to the track ring assembly 11, is configured wherein the ends the surrounding housings of each motor do not extend beyond distance "D" which currently is preferably 0.75 inches, past the exterior circumferential edge of the track ring 14. After much experimentation, it was found that distance "D" being less than 0.75 inches allows the device 10 herein a significant increase in utility since it will fit between extremely close adjoining pipe 12 sections and weld abutting edges, even in situations such as shown in FIG. 3, where a U-shaped joined pipe 12 configuration is formed by one or two welds 17 formed by the device 10.

Figure 2:
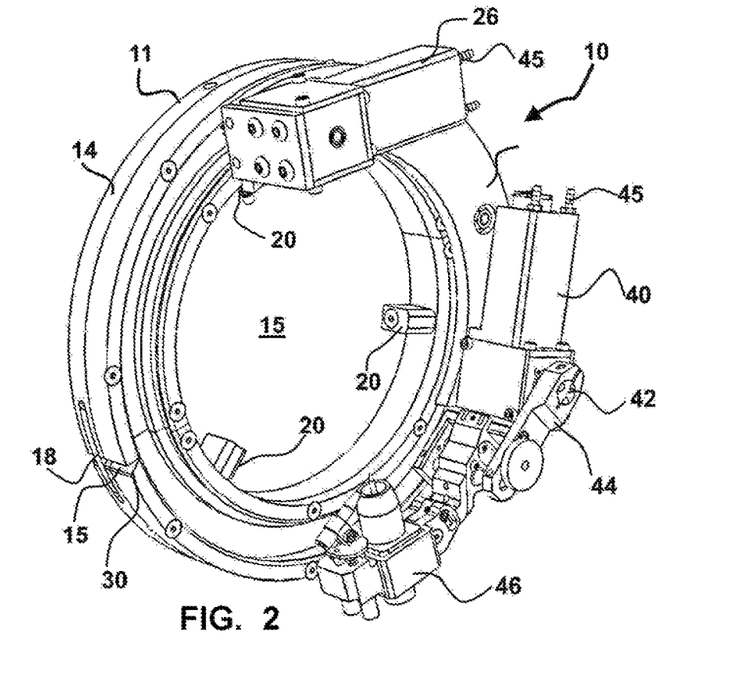
FIG. 2 shows a perspective view of the device as in FIG. 1 without the tube or pipe communicating through the opening in the formed ring.
Figure 9:
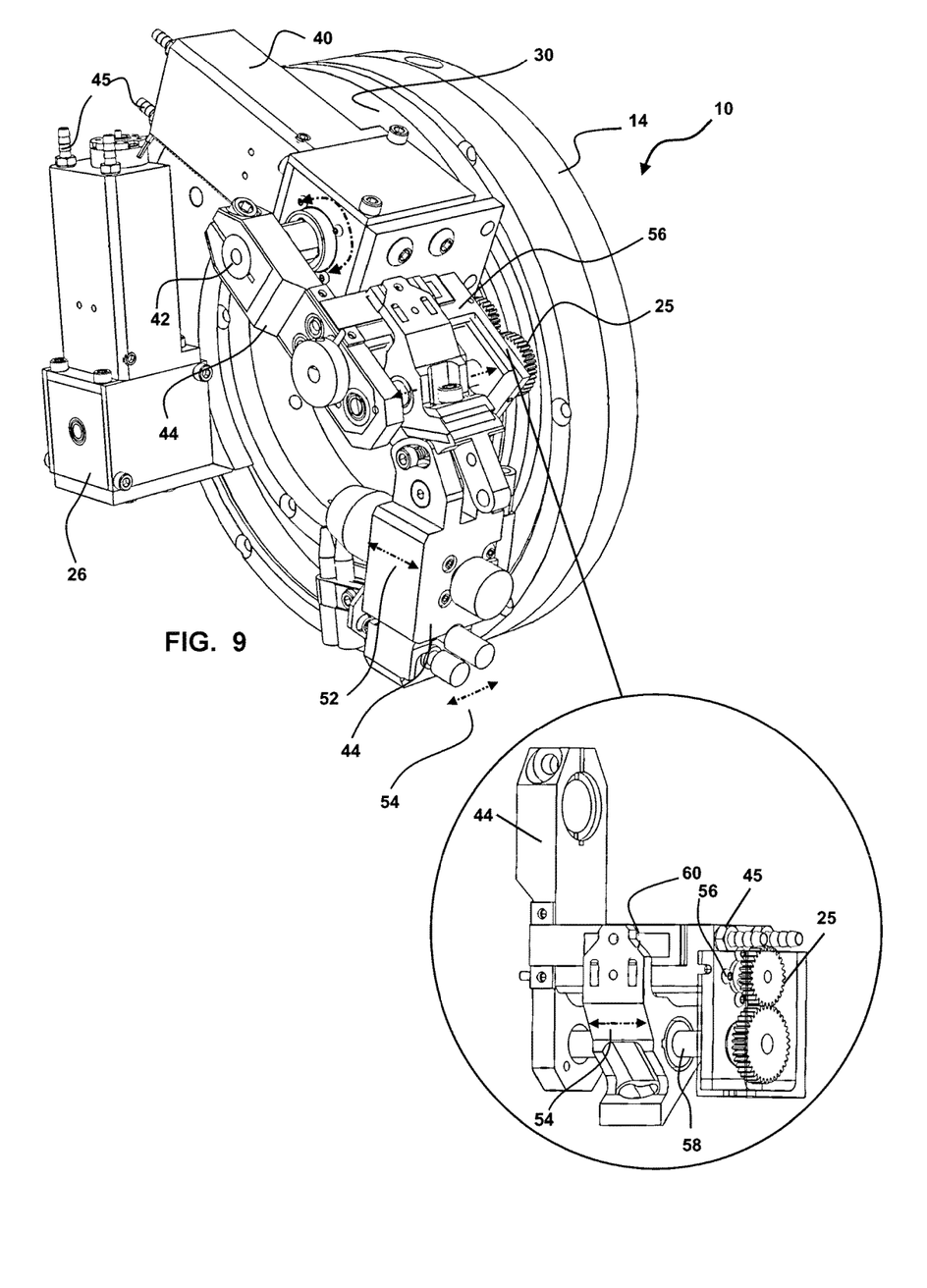
FIG. 9 depicts an especially preferred mode of the device herein, providing travel to the welding head in two planes providing oscillating movement to the welding head in directions perpendicular and parallel to the axis of the pipes or fittings being joined.

The second motor 40 when energized, will rotate the axial shaft 42 at a direction and speed determined by a control which varies the power communicated to the second motor 40. This axial shaft 42 is operatively connected with one end of an arm 44 which is engaged at an opposite end with a welding head 46. Rotation of the axial shaft 42 as can be seen in FIGS. 2 and 5 and 9, will move the distal end of the arm 44, to which the welding head 46 is engaged, along a first axis 52 perpendicular to and running toward and away from the exterior circumferential surface of a segment to be welded, such as pipe 12. This allows the welding head 46 to be located in a highly accurate position throughout rotation of the curved travel carriage 30 around the track ring 14, and concurrently around the surface of the pipe 12 forming a weld 17 by the welding head 46.

As noted, in operative engagement to the distal end of the arm 44 which is engaged to the axial shaft 42, is the weld head 46. The consists of a mechanical cross seam assembly coupled with a torch block assembly and a two-division of freedom wire manipulation device. The torch block assembly is preferably water cooled to maintain operative ability even under high heat conditions, as are the first motor 26 and second motor 40 which have hose connectors 45 for such fluid circulation thereon.

The compact nature of the integral track ring 14 and gear train also enable the compact positioning of the welding arm 44. The width of the arm 44, welding head 46, second motor 40 and first motor 26, in this compact configuration, as measured by the distance to outside surfaces spaced from and facing away from the surface of the track ring 14 having the recess, and the distance of projection of the housings of the first motor 26 and second motor 40 "D" past the exterior circumference of the track ring 14, is such, that the device 10 is able to weld abutted segments where the axial and radial constraints are as low as 3.5" and 2.5". This allows the device 10 to produce high quality welds, on abutting segments to be welded such as pipes, in highly constrained areas of operation such a boilers and the like.

Figure 8:
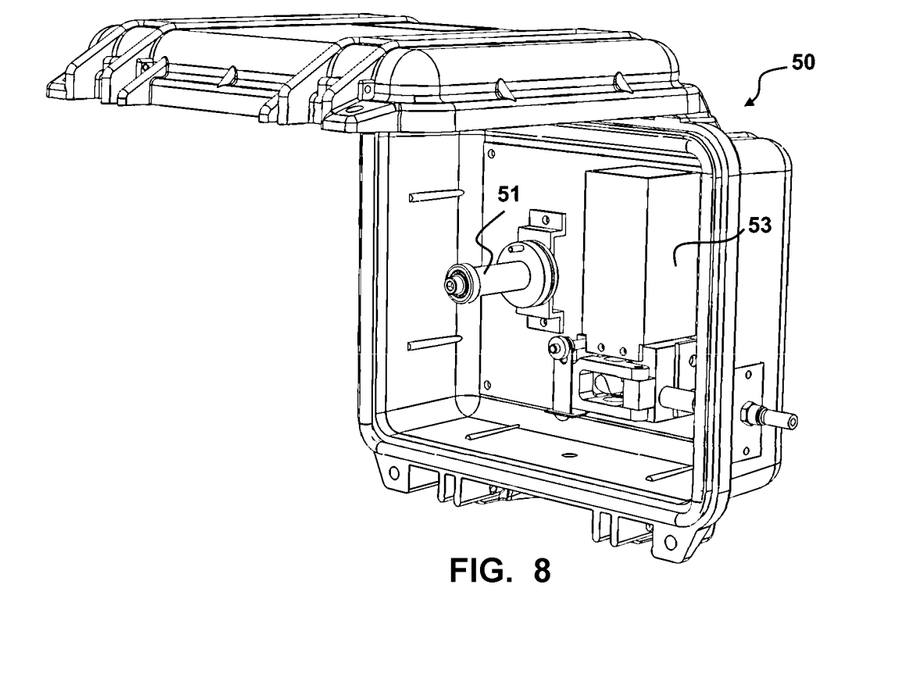
FIG. 8 depicts the portable wire feeding spool for providing wire to the welding head of the device at a controlled rate.

Shown in FIG. 8 is the welding wire feed 50 to translate the wielding wire from the powered spool 51 to and for use by the torch block assembly at the welding head 46. The remote wire feed 50 provides for automatic wire translation using the powered spool 51 or other means into the weld 17 arc during operation of the device 10 herein and is transportable to the site of the welding device 10 as it is operatively positioned within a case. Gas may be provided by a remote supply also as may a pump for communication of cooling fluids to the welding head 46. A controller 53 may be employed to control wire feed as well as the functions and speed and rotation of the motors as noted.

FIG. 9 depicts an especially preferred mode of the device 10 herein, providing travel to the welding head 46 along the first axis 52 and additionally along a second axis 54 running parallel to the exterior surface of the pipe 12 being welded. Thus, the welding head 46 is capable of movement along the first axis 52 and second axis 54 in two planes. Movement of the welding head along the second axis 52 is provided by a third motor 56 in geared 25 engagement with a translation shaft 58 which is in a connection with a secondary mount 60 such that rotation of the gears 25 by the third motor 56, translates the secondary mount 60 in a sliding engagement with the a first end of the arm 44.

Employing this third motor 56, and a controller which operates in a manner to control the direction and speed of rotation of the third motor 56, translation in two directions along the second axis 54 may be imparted to the welding head 46. Translation in the first direction 52 from the rotation of the second motor 40 rotating the shaft 42, and translation in the second direction 54 from oscillation of the secondary mount 60 interposed between a first end of the arm 44, and the welding head 46.

Such provides an oscillating movement to the welding head 46 along the second axis 54 parallel to the surface of the pipe 12 being welded. This is combined with the rotation of the second motor 20 controlling movement of the welding head 46 along the first axis 52 perpendicular to the exterior surface of the pipe 12 being engaged by a weld 17, and thus a significant improvement in control of the welding head 46 in two planes.

FIG. 10 depicts the ring assembly 11 herein operatively engaged with a pipe 12 centered in the opening 15. As shown, maximum distance of projection "D" any engaged components to the assembly 11 is desirable. Currently it has been found that the distance of projection "D" being less than 0.75 inches is particularly preferred as it has been found in extensive experimentation with differing diameter pipe 12 and differing positioning of welds 17 by the device 10, that this maximum distance of projection D past the exterior circumference 61 of the assembly 11, allows the device 10 to be positioned close to adjacent pipes 12 and in U-shaped or other configurations. Distances exceeding 0.75 inches for shown distance D, were not as successful and allowing mounting and used of the device 10 in U-shaped engagements of pipe 12 to be engaged with welds 17.

While all of the fundamental characteristics and features of the orbital welding device and method have been shown and described herein, with reference to particular embodiments thereof, a latitude of modification, various changes and substitutions are intended in the foregoing disclosure and it will be apparent that in some instances, some features of the orbital welding invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

What is claimed:

1. An orbital welding apparatus for forming a weld bead to engage adjoining segments of pipe, comprising:
   an annular track ring having an opening defined by an interior circumference and having an exterior circumference, said opening adapted for engagement with an exterior circumference of a said pipe;
   said track ring having a circular recess formed therein on a side surface;
   a travel carriage slidably engaged within said recess;
   a first motor engaged to said travel carriage, said first motor having a first axle engaged with a first gear;
   said first gear engaged with a gear track positioned in communication with said recess;
   rotation of said first motor imparting a translation of said travel carriage within said recess;
   a second motor engaged with said travel carriage, said second motor rotating a second axle;
   an arm having a first end engaged with said second axle;
   said arm having a second end engaged with a welding head; and
   whereby said welding head is positionable around an exterior circumference of said pipe to position a weld thereon by said translation of said carriage within said recess, and a distance of said welding head from said exterior circumference along a first axis, is adjustable by rotation of said second motor.

2. The orbital welding apparatus of claim 1, wherein said opening is adapted for engagement with an exterior circumference of a said pipe by a plurality of adjustably translatable members extending away from said interior circumference.

3. The orbital welding apparatus of claim 1 additionally comprising:
   said annular track ring being formed of two track ring segments;
   a pivot engaging respective first ends of each of said two track ring segments; and
   a lock engageable between respective second ends of said track ring segments.

4. The orbital welding apparatus of claim 2 additionally comprising:
   said annular track ring being formed of two track ring segments;
   a pivot engaging respective first ends of each of said two track ring segments; and
   a lock engageable between respective second ends of said track ring segments.

5. The orbital welding apparatus of claim 1 additionally comprising:
   said arm formed of a first portion of said arm extending from said second axle to a first portion of a secondary mount and a second portion of said arm extending from said welding head to a second portion of said secondary mount which is in sliding engagement with said first portion of said secondary mount;
   a third motor engaged to translate said sliding portion of said secondary mount, whereby said welding head is translatable along a second axis, normal to said first axis.

6. The orbital welding apparatus of claim 2 additionally comprising:
   said arm formed of a first portion of said arm extending from said second axle to a first portion of a secondary mount and a second portion of said arm extending from said welding head to a second portion of said secondary mount which is in sliding engagement with said first portion of said secondary mount;
   a third motor engaged to translate said sliding portion of said secondary mount, whereby said welding head is translatable along a second axis, normal to said first axis.

7. The orbital welding apparatus of claim 3 additionally comprising:
   said arm formed of a first portion of said arm extending from said second axle to a first portion of a secondary mount and a second portion of said arm extending from said welding head to a second portion of said secondary mount which is in sliding engagement with said first portion of said secondary mount;
   a third motor engaged to translate said sliding portion of said secondary mount, whereby said welding head is translatable along a second axis, normal to said first axis.

8. The orbital welding apparatus of claim 4 additionally comprising:
   said arm formed of a first portion of said arm extending from said second axle to a first portion of a secondary mount and a second portion of said arm extending from said welding head to a second portion of said secondary mount which is in sliding engagement with said first portion of said secondary mount;
   a third motor engaged to translate said sliding portion of said secondary mount, whereby said welding head is translatable along a second axis, normal to said first axis.

* * * * *